Dec. 10, 1968    J. E. MARTIN    3,415,382
FILTER UTILIZING GLASS BALLS FOR FILTERING FLUIDS
Filed July 18, 1966    2 Sheets-Sheet 2
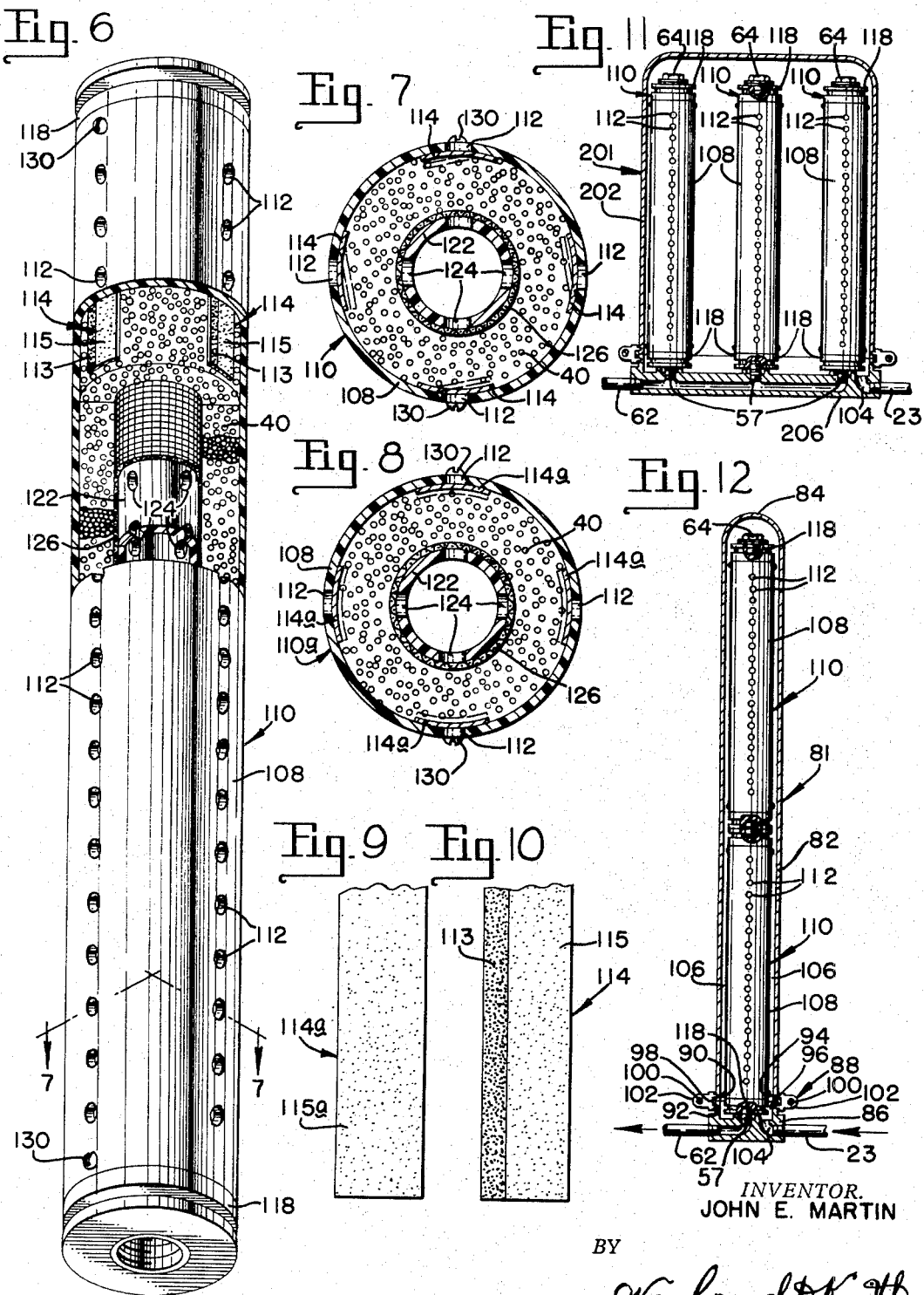
INVENTOR.
JOHN E. MARTIN
BY
Wayland D Keith
HIS AGENT

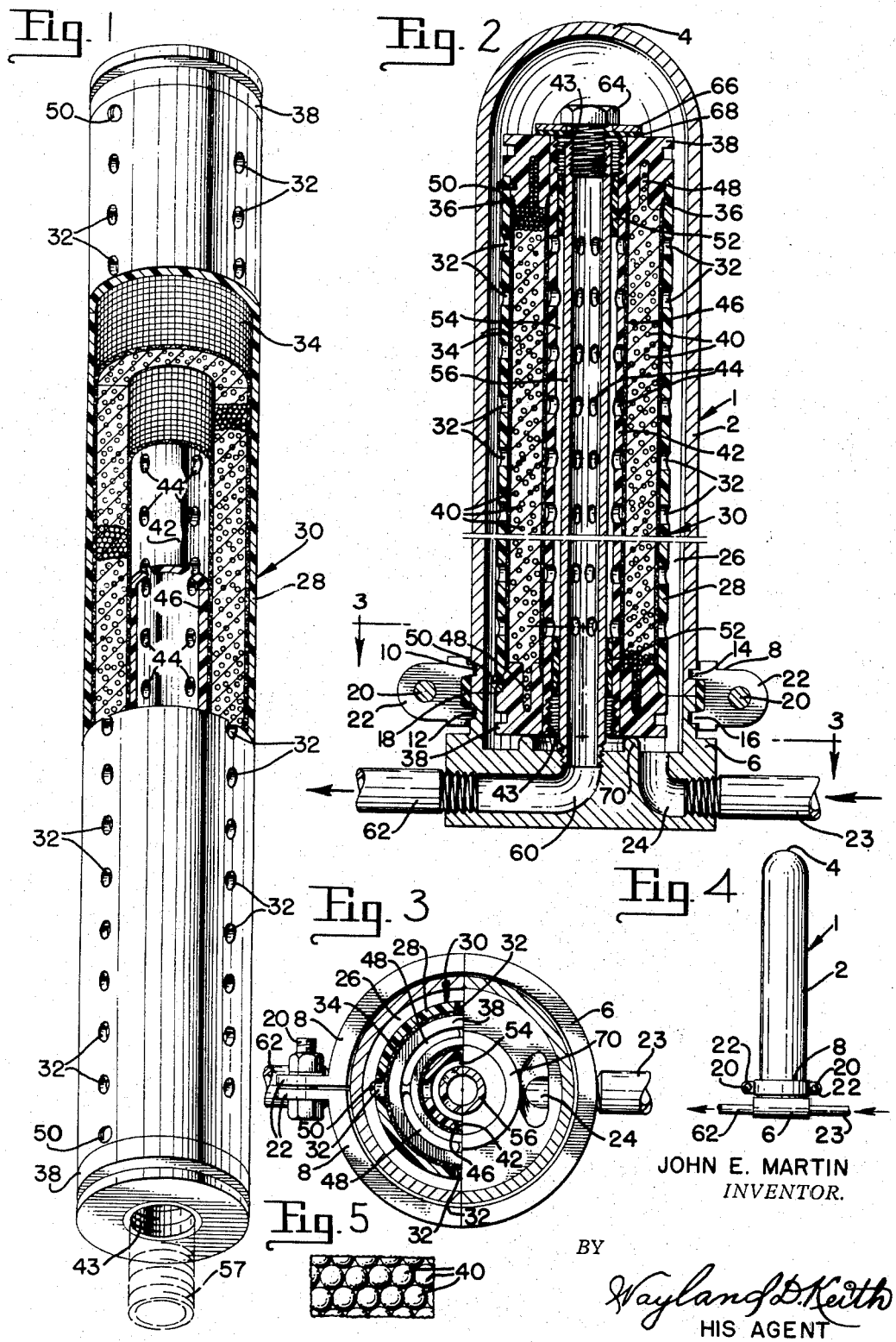

United States Patent Office 3,415,382
Patented Dec. 10, 1968

3,415,382
FILTER UTILIZING GLASS BALLS FOR
FILTERING FLUIDS
John E. Martin, 4215 York, Wichita Falls, Tex. 76309
Filed July 18, 1966, Ser. No. 570,387
3 Claims. (Cl. 210—282)

ABSTRACT OF THE DISCLOSURE

A filter unit utilizing minute glass balls within an annular space formed between perforate cylindrical members, which members are normally closed at one end and open at the opposite end, except when a series of filter units are joined in end to end relation. The filter media is minute glass balls, which filter media is maintained within the annular space between the perforate cylindrical members by mesh screen material covering the perforations. An alternate arrangement is to provide the inlet holes in the perforate outer cylindrical member with a closure, during assembly, of tape having adhesive material on at least one side, to maintain the filter media within the cylindrical casings during installation, and which tape forms a longitudinal inlet valve for the fluid being filtered. The ends of the cylindrical filter members are screw threaded engagement with pipe or to permit the use of multiple filters.

---

This invention relates to improvements in filters and more particularly to filters for filtering unwanted solids from liquids.

Various filters have been proposed heretofore which were designed, for the most part, for a specific filtering job; however, the present filter is so designed that, by the variation of the filter media, the filter may be used for filtering solids from various liquids.

The present invention is so designed that the filter media is enclosed within a shell, which shell forms a cartridge so the filter media may be removed and replaced with new material or the filter media may be removed, cleansed, and replaced, thereby greatly minimizing the cost and maintenance of such filters.

An object of this invention is to provide a filter unit which may be made in an elongated cylindrical shell in such manner that one or more filter cartridges may be used on a single outlet pipe, thereby enabling the capacity of the filter to be increased in accordance with the number of filter cartridges used, or a plurality of outlet pipes may be positioned in parallel relation within a casing with one or more filter units or cartridges on each outlet pipe, which casings with multiple pipes therein are conventional.

Another object of the invention is to provide a filter unit, most of which unit may be made of non-metallic or noncorrosive material so the filter may be used over an indefinite period of time and the filter media of which unit may be removed and revitalized by cleansing.

Still another object of the invention is to provide in a filter cartridge, a perforate outer shell and a perforate inner shell or tube, which perforations are covered with a wire mesh of such size as to retain the filter media of glass globules within the annular space between the perforate shells.

Still another object of the invention is to provide a cylindrical filter cartridge having a perforate outer shell and a perforate inner shell or tube, which perforations are covered by mesh material so that minute balls of glass may be placed within an annular space between the screen mesh material so the minute glass balls will act as a filter media for filtering liquids having solids therein.

Still another object of the invention is to provide elongated, cylindrical filter cartridges which may be coupled in end to end relation to provide a filter of greater capacity.

Still another object of the invention is to provide a filter cartridge having an inner shell and an outer shell or tube, which shells are made of resinous plastic material, the resinous plastic ends of which are fitted in telescoping relation to form a casing to enclose mesh screen material and glass beads in compact relation, so as to form a filter which is substantially free from deterioration due to the action of salt water or other deleterious material thereon.

Still a further object of the invention is to provide an elongated filter cartridge which has a perforate outer shell, a filter media within the shell, a retaining screen to prevent the filter media from passing into the outlet tube, and a lineal inlet valve, which is formed by a strip of adhesive tape, covering the fluid inlet perforations in the outer shell, which valve will retain the filter media within the outer shell while the cartridge is being handled, but which will yield to permit entrance of the fluid into the cartridge while fluid is passing therethrough and which will retain glass balls within the filter cartridge when fluid is not passing therethrough.

A penultimate object of this invention is to provide for a filter casing, cleansible filter media, which filter casing and the media therein may be readily disassembled and reassembled in a minimum of time.

A final object of the invention is to provide a removable and replaceable filter cartridge which is low in the cost of manufacture, easy to install, and which has excellent filtering qualities.

With these objects in mind and others which will become manifest as the description proceeds, reference is to be had to the accompanying drawings in which like reference characters designate like parts in the several views thereof, in which:

FIG. 1 is a perspective view, with parts broken away and with parts shown in section, of a filter cartridge shown apart from the filter casing;

FIG. 2 is a longitudinal, sectional view of a filter, showing a filter cartridge or cartridges, with portions being shown in elevation;

FIG. 3 is a sectional view taken on the line 3—3 of FIG. 2, looking in the direction indicated by the arrows;

FIG. 4 is an elevational view of a filter as installed on a pipeline;

FIG. 5 is a greatly enlarged view of the filter media used within the filter cartridge to filter solids from fluids;

FIG. 6 is a perspective view similar to FIG. 1, but showing a modified manner of retaining the filter media within the outer shell;

FIG. 7 is a sectional view taken on line 7—7 of FIG. 6, looking in the direction indicated by the arrows;

FIG. 8 is a cross sectional view similar to FIG. 7, but of a still further modified form of the invention;

FIG. 9 is a fragmentary, elevational view of a piece of pressure sensitive, permanently tacky adhesive tape, the coating on a face of which tape is soluble in the fluid being filtered;

FIG. 10 is a view similar to FIG. 9, but of a pressure sensitive, permanently tacky adhesive tape with an edge portion of the face thereof being coated with an adhesive coating which is insoluble in the fluid being filtered, the remaining portion of the face surface being coated with an adhesive which is soluble in the fluid being filtered so as to enable the strip of adhesive tape to be applied longitudinally within the outer filter shell to close the perforations thereof during handling and shipping;

FIG. 11 shows a filter unit utilizing a multiplicity of filter cartridges arranged in side-by-side relation with a portion of the housing of the filter broken away, portions being shown in section, and showing the filter cartridges mounted therein; and FIG. 12 is a view similar to FIG. 11, but with filter cartridges coupled in end-to-end relation.

With more specific reference to the drawing, the numeral 1 designates generally a filter unit having a casing 2, which casing is closed at an end thereof as designated at 4. The opposite end of casing 2 is open and is joined to a base 6 by a semi-circular clamp ring 8. The casing 2 has an annular groove 10 formed exteriorly therein near the open end thereof. A similar annular groove 12 is formed around the end of the base adjacent to the open end of casing 2 so that the semi-circular clamp rings 8, which have inturned, spaced apart, semi-annular ribs 14 and 16 formed thereon to complementally engage the respective annular grooves 10 and 12. An elastomer ring 18 surrounds the abutting ends of the base 6 and the casing 2, which elastomer ring 18 seals the joint between the casing and the base.

Bolts 20 extend through apertured lugs 22 on semi-circular clamp rings 8 to enable the semi-circular clamp rings to be brought into compressive relation with elastomer ring 18, casing 2, and base 6.

The base 6 of the filter has a pipe 23 connected thereto, which pipe is in fluid communication with an inlet opening 24 formed therein through which fluid is directed into the annular space 26 between the casing 2 and the outer cylindrical shell 28 of the filter cartridge, designated generally by the numeral 30. The outer cylindrical shell 28 has performations 32 formed therein, which are spaced longitudinally and circumferentially thereof. The outer cylindrical shell 28 is preferably made of a synthetic resinous plastic. A fine mesh screen 34 is positioned within the outer cylindrical shell 28, which fine mesh screen extends substantially the entire length of the outer cylindrical shell 28, and which fine mesh screen is fitted within and annular recess 36 and within each end member 38, so as to hold the fine mesh screen 34 in secure relation. The fine mesh screen 34 is preferably formed of a non-corrosive material such as stainless steel, copper, woven plastic, or the like, and is preferably tubular in form to obviate leaking joints; and the fine mesh screen is of such degree of fineness as to retain the filter media, such as fine, spherical glass balls 40 which may be of such size as to perform the desired filtering function of the fluid passing therethrough. The fine, spherical glass balls 40 are non-absorbent, and, when filled within a container, will normally seek a position of interfitting in such relation which allows three balls, when in adjacent contact relation, to form a triangle with concave sides, the maximum round solid that will not pass therethrough would be approximately one-seventh of the diameter of the interfitting balls. Therefore, glass balls of one inch in diameter, when interfitting in this relation, will filter out solids of approximately 5/32 inch and larger in diameter.

Filters of this character may be operated in series if it is desired to remove solids of relatively larger diameter during the initial filtering, with each subsequent filtering having the glass balls therein of smaller diameter until minimum size particles are removed from the fluids. Glass balls of a size of a standard 40 mesh screen are 420 microns in size and, when interfitted, will present an opening between the balls to filter out solids of 60 microns in size. A 100 mesh screen will give a glass ball of 140 microns in size which will filter out solids of approximately 21 microns in size, which is considered microscopic in size; however, glass balls of a 200 mesh screen are of 74 microns in size and will filter out solids of approximately 10 microns and larger in size. By using glass balls of a 400 mesh screen, size, the glass balls will be of approximately 37 microns in size, which will filter out solids of about 5 microns and larger in size.

As the fluid containing solids continues through the present filter and a filter cake of the material being filtered out is formed therein, the filtrate becomes more pure as only the solids of smaller size are permitted to pass therethrough until the voids between the glass balls within the filter are completely filled with solids. However, when the volume through the filter begins to diminish materially, and the pressure begins to rise, the glass balls 40 may be removed therefrom, cleansed, and replaced, or the filter may be filled with new glass balls as set forth above; and the full capacity of the filter may be readily restored.

Generally, the glass balls will range in size from two and one-half mesh screen size, which balls are 8 millimeters in size, to approximately 100 mesh screen of 149 microns in size. However, as explained above, the glass balls may be as large or as small as desired, with the size depending upon the purity required of the filtrate.

The filter has an inner cylindrical tube or shell 42 which has perforations 44 formed therein, which perforations are spaced longitudinally and circumferentially thereof. The inner cylindrical tube or shell 42 is surrounded by a fine mesh screen 46, which mesh screen is preferably tubular in shape and extends the greater part of the length of the inner cylindrical tube or shell 42. Each end member 38 has an annular recess formed at the inner end thereof to receive an end of the fine mesh screen 46 to thereby prevent mislocation of the screen and to prevent passage of fluid around the end thereof.

Each end member 38 has a series of annular-like pockets 48 formed therein intermediate the inner and outer diameter thereof, to receive the filter media, such as fine, spherical glass balls; so upon compressing the end members 38 into tight fitting relation with the outer cylindrical shell 28 and the inner cylindrical tube or shell 42, the fine, spherical glass balls 40, if too great in quantity to fill the normal annular space formed between the outer fine mesh screen 34 and the inner fine mesh screen 46, will cause the fine, spherical glass balls to migrate into the annular-like pockets 48.

While it is preferable to assemble the component parts under pressure of a press, after the end members 38 have been pressed into place into the outer cylindrical shell 28 and onto the inner cylindrical tube or shell 42, screw elements 50 pass through the outer cylindrical shell 28 to threadably engage each of the end members 38 to hold the outer cylindrical shell 28 in fixed relation with respect to the respective end members 38.

An annular plastic bushing 52 is positioned within each end of the inner cylindrical tube or shell 42 so as to provide an annular space 54 intermediate an outlet tube 56 and inner cylindrical tube 42, which outlet tube connects with outlet 60 in base 6, and the inner cylindrical tube or shell 42, so that the fluid passing through perforations 44 will pass into the annular space 54, and thence out through perforations 58 into outlet tube 56, and thence outward through base 6 into outlet 60 formed therein, and thence into outlet pipe 62. The outlet tube 56 is screwthreaded into the base 6 in the form of the invention as best seen in FIG. 2. However, by the use of threaded nipples 57, the nipples 57 may be screwthreaded into the base 6 and the inner cylindrical tube or shell 42, thereby eliminating the use of the outlet tube 56. In so doing, the upper end of the filter cartridge 30 is closed as by a screwthreaded plug (not shown), in a manner similar to the closing of the end of the filter in FIG. 2.

The filter cartridge 30 is held in place within casing 2 by a screwthreaded bolt 64 which threadably engages the screwthreaded upper end of outlet tube 56, which outlet tube is shorter than the length of filter cartridge 30 so that the screwthreaded bolt 64 applies pressure to a washer 66 which will cause a sealing ring 68 to form a seal between the upper end member 38, of the filter cartridge 30, and the end of the outlet tube 56.

The opposite end of the filter cartridge 30 seats on an annular boss 70 within the inner confines of base 6, which annular boss 70 forms a seal against the passage of fluid from annular space 26 into outlet tube 56, until the fluid has passed through the filter media composed of fine, spherical glass balls 40, which are usually minute in size.

While the filter cartridge 30 is shown in FIG. 2 as being telescoped over an outlet tube 56, each end of the cartridge is screwthreaded, as indicated at 43, one of which screwthreaded ends threadably engages a pipe nipple 57, as shown in dashed outline in FIG. 1, which nipple may be screwthreaded into the base 6, thereby eliminating the use of the outlet pipe 56. Furthermore, two or more of these filter cartridges 30 may be coupled together in end to end relation by nipples 57, as shown in dashed outline in FIG. 12, to form a multiple unit filter.

A second form of the invention

A filter unit is designed generally by the numeral 81, which filter unit has a casing 82 which is closed at the upper end, as designated at 84. The opposite end of the casing 82 is open and is joined to a base 86 by a semi-circular clamp ring 88. The casing 82 has an annular groove 90 formed exteriorly therein which groove is similar to annular groove 10, as shown in FIG. 2. A similar annular groove 92 is formed in the end of the base 86 adjacent the open end of casing 82 so that the semi-circular clamp ring 88, which has inturned, spaced apart, annular ribs 94 and 96 thereon, which ribs are similar to ribs 14 and 16 as disclosed in FIG. 2, and complementally engage the annular grooves 90 and 92. An elastomer ring 98 surrounds the abutting ends of the base 86 and the casing 82, which elastomer ring 98 seals the joint between the casing 82 and the base 86.

Bolts 100 extend through apertured lugs 102 in semi-circular clamp rings 88 to enable the semi-circular clamp rings to be brought into compressive relation with elastomer ring 98, casing 82, and base 86.

The base 86 of the filter unit 81 has a pipe 23 connected thereto which pipe is in fluid communication with an inlet opening 104 formed therein through which fluid is directed into the annular space 106 between the casing 82 and the outer cylindrical shell 108 of filter cartridges 110. The outer cylindrical shell 108 has perforations 112 formed therein, which perforations are formed in longitudinal rows which are circumferentially spaced around the outer cylindrical shell 108.

The outer cylindrical shell 108 is preferably made of synthetic, resinous plastic with a lineal tape 114, such as shown in FIGS. 6, 7 and 10, which tape has a pressure sensitive, permanently tacky adhesive coating on one face thereof, with a coating 113 being insoluble in the fluid being filtered, and an adhesive coating 115 being soluble in the fluid being filtered. With strips of lineal tape 114 covering the rows of perforations 112, as shown in FIGS. 6 and 7, and with the adhesive being in sealing relation for the entire length of the outer cylindrical shell 108, the outer cylindrical shell is closed against loss of filter media, such as roundish glass balls 40, which do not necessarily have to be spherical, but may be ovaloid in shape so long as when several of the filter media are assembled in accumulated relation, the voids between the round glass balls or ovaloid glass solids will present a void between the three or four adjacent round surfaces. These glass balls, either regular or slightly irregular in shape, fill an annular space between the outer cylindrical shell 108 and inner cylindrical tube 122 which has perforations 124 formed therein. The inner cylindrical tube 122 has a fine mesh, tubular screen sleeve 126 thereover to cover the perforations 124 so as to retain the filtering media therein.

The ends of the outer cylindrical shell 108 and inner cylindrical tube 122 are closed by end members 118 so as to retain the glass balls within the annular space formed between the outer cylindrical shell 108 and the inner cylindrical tube 122.

With the filter cartridges 110 secured in any of the type filters as shown in FIGS. 4, 11 or 12, and with the fluid being introduced into the annular space, such as shown at 106 in FIG 12, the pressure will cause the pressure sensitive adhesive tape 114, which forms a lineal valve, to yield; whereupon, the fluid will wash off the soluble coating 115 which will permit the fluid to flow inward into the annular space between the outer cylindrical shell 108 and the inner cylindrical tube 122, which is filled with glass balls 40. In the form of the invention as shown in FIG. 10, the adhesive coating 113, which is soluble in the fluid being filtered, will hold the lineal tape 114 in fixed relation with respect to the rows of perforations 112 which will permit the fluid being passed inwardly therethrough to flow into the filter cartridge 110, but will prevent the filter media from passing out through the perforations 112. In this manner, one screen is dispensed with, which enables the device to be made at less cost and, at the same time in dispensing with the screen, the fluid being filtered passes directly into the filter media formed by the glass balls without the possibility of the screen becoming clogged, and the life of the filter being prematurely shortened.

This form of the filter cartridge 110, as shown in FIGS. 6 and 7, is interchangeable with the filter cartridge 30 as shown in FIGS. 1, 2 and 3; therefore, the filter cartridges 30 and 110 may be used interchangeably within casings 2 and 82.

The filter cartridges 30 and 110 may also be used interchangeably in the filter unit 201 as shown in FIG. 11, which enables the filter cartridges to be arranged in multiples in side-by-side relation within a casing 202 so that the liquid being filtered may be passed through pipe 23, into filter unit 201, and out through an outlet pipe 62. These filter cartridges 30 or 110 are shown to be screwthreaded, and each has a nipple 57 screwthreaded thereinto and into base 206. One end of each of the filter cartridges is plugged by a screwthreaded plug 64, which threadably engages the inner cylindrical tube 122.

Third form of the invention

A third form of the invention, as shown in FIG. 8, which utilizes a filter cartridge 110a, is similar in construction to filter cartridges 30 and 110. The present filter cartridge has an outer cylindrical shell 108 with perforations 112 therein, and is similar in all respects to the form of the invention as shown in FIGS. 6 and 7, except the lineal adhesive tape 114a has one face thereof coated with a cement which is soluble in the liquid being filtered. However, the tape 114a is placed over rows of perforations 112, as shown in FIG. 8, which will seal the perforations in the outer cylindrical shell 108 against egress of the filter media, such as roundish glass balls 40 with a fine mesh, tubular screen 126 surrounding the inner cylindrical tube 122. After the glass balls 40 are positioned with the annular space formed between the outer cylindrical shell 108 and the inner cylindrical tube 122, which tube 122 is closed at one end by an end member 118; the other end member 118 is pressed into place, and a screw 130 passes through an aperture in each end of the outer cylindrical shell 108 and the screwthreaded end members 118 to hold the end members 118 in fixed relation within outer cylindrical shell 108 and surrounding the inner cylindrical tube 122 so that the liquid being filtered will pass readily inward through perforations 112 which will dissolve the cement on lineal tape 114a, which will cause the tape to move inwardly sufficiently to permit the fluid to pass thereby and into and through the glass ball filtering media; thence through a fine mesh, tubular screen 126 and out through perforations 124 to be discharged out of inner cylindrical tube 122 in the manner as disclosed in the first mentioned forms of the invention.

As distinguished from the second form of invention, the entire coating 115a is dissolved which permits the fluid being filtered to be spread outwardly on either side of the rows of perforations 112 and into the glass balls 40 forming the filter media.

The strip of adhesive tape will retain the glass balls 40 against passing outwardly through the perforations 112 while the filter is being handled, shipped and/or installed. However, after instalaltion of the filter and after the coating 115a has become dissolved, the adhesive tape which forms a lineal valve will permit the liquid to pass inwardly into the filter. Upon cessation of flow, the glass balls 40 will press the filter into contact relation with the inner surface of the outer cylindrical shell 108 which will retain the glass balls therein.

Having thus clearly shown and described the invention, what is claimed as new and desired to be secured by Letters Patent is:

1. A composite filter cartridge for filtering solids from liquids, for use in combination with a filter casing, which filter cartridge comprises;
   (a) a pair of end members,
   (b) an inner perforate tube for passage of liquid thereinto and therethrough,
      (1) said inner perforate tube being engageable with said end members,
   (c) a screen surrounding said innter perforate tube,
   (d) spacer members surrounding said inner perforate tube, one near each end thereof,
   (e) an outer cylindrical shell having at least one longitudinal row of perforations formed therein, which shell is of greater diameter than said inner perforate tube, and which shell surrounds said inner perforate tube and is engaged with each said end member,
      (1) said outer cylindrical shell and said inner perforate tube defining an annular space therebetween,
   (f) at least one tape within said outer cylindrical shell and covering said at least one longitudinal row of perforations,
      (1) said tape, which covers the perforations in said outer cylindrical shell being adapted to admit liquid therethrough into said annular space,
   (g) roundish glass balls filling said annlar space defined by said outer cylindrical shell and said inner perforate tube and said end members,
      (1) said tape being adapted to retain said roundish glass balls within said annular space said tape is a lineal tape, and at least a portion of said tape having an adhesive thereon soluble in the liquid being filtered.

2. A device for filtering solids from liquids as defined in claim 1; wherein
   (1) a portion of one side of the adhesive being insoluble within the liquid being filtered.

3. A device for filtering solids from liquids as defined in claim 1; wherein
   (a) said, tape covering the perforations within said outer cylindrical shell is a pressure sensitive, permanently tacky adhesive tape.

References Cited

UNITED STATES PATENTS

| | | | |
|---|---|---|---|
| 772,389 | 10/1904 | Webb | 210—457 X |
| 3,260,367 | 7/1966 | Hultgren | 210—440 X |
| 3,262,563 | 7/1966 | Pall | 210—443 X |
| 619,569 | 2/1899 | Hewell | 210—489 X |
| 898,545 | 9/1908 | Barnes | 210—440 X |
| 2,059,358 | 11/1936 | Johnson et al. | 210—282 |
| 2,548,400 | 4/1951 | Shepard | 210—323 |
| 2,626,057 | 1/1953 | Clabaugh | 210—440 X |
| 3,182,803 | 5/1965 | Chrisholm | 210—228 X |
| 3,289,847 | 12/1966 | Rothemund | 210—282 X |
| 3,312,349 | 4/1967 | Rosaen | 210—497 X |

SAMIH N. ZAHARNA, *Primary Examiner.*

U.S. Cl. X.R.

218—288, 489, 440